(12) United States Patent
Tsai et al.

(10) Patent No.: US 9,077,906 B1
(45) Date of Patent: Jul. 7, 2015

(54) VIDEO CONTRAST ADJUSTING METHOD

(71) Applicant: AVer Information Inc., New Taipei (TW)

(72) Inventors: Cheng-Mou Tsai, New Taipei (TW);
Wei-Ting Pong, New Taipei (TW);
Huah Tu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 60 days.

(21) Appl. No.: 14/165,587

(22) Filed: Jan. 28, 2014

(51) Int. Cl.
*H04N 5/57* (2006.01)
*H04N 5/14* (2006.01)
*G06K 9/40* (2006.01)
*H04N 5/235* (2006.01)
*H04N 5/243* (2006.01)

(52) U.S. Cl.
CPC ............. *H04N 5/2351* (2013.01); *H04N 5/243* (2013.01)

(58) Field of Classification Search
None
See application file for complete search history.

(56) References Cited

U.S. PATENT DOCUMENTS

| 7,916,219 B2 * | 3/2011 | Kodavalla ...................... 348/672 |
| 2005/0152615 A1 * | 7/2005 | Hutchinson et al. .......... 382/274 |
| 2005/0270486 A1 * | 12/2005 | Teiwes et al. ................. 351/209 |
| 2012/0321134 A1 * | 12/2012 | Shen et al. .................... 382/103 |

FOREIGN PATENT DOCUMENTS

TW          200826014          6/2008

* cited by examiner

*Primary Examiner* — Aung S Moe
*Assistant Examiner* — Euel Cowan
(74) *Attorney, Agent, or Firm* — CKC & Partners Co., Ltd.

(57) ABSTRACT

A method for adjusting a contrast value of a video capturing end to a optimum contrast value is provided. Firstly, a first video image and a first contrast value of the first video image are gathered by a software part. A reference image is generated according to the first video image. The first video image is compared with the reference image to generate a first image evaluation value and an operation is performed to determine whether the first image evaluation value is greater than a first threshold. When the first image evaluation value is smaller than the first threshold, a second contrast value is generated according to the first contrast value and a dynamical contrast adjusting value. The second contrast value is sent to a firmware part by the software part to adjust a contrast value of the video capturing end according to the second contrast value.

19 Claims, 3 Drawing Sheets

VIDEO CONTRAST ADJUSTING METHOD

BACKGROUND

1. Field of Invention

The invention relates to an adjusting method, and particularly relates to a method for adjusting a contrast value of a video image.

2. Description of Related Art

A contrast value is a property of a video image, defined as the ratio of the luminance of the brightest color (white) to that of the darkest color (black) in the video image. A high contrast ratio is a desired aspect of any display.

Typically, a software adjusting method is used to adjust the contrast value of a video image to improve display quality. However, when a video image has a lower contrast ratio, even though software is used to adjust the contrast value of the video image, the adjustment result usually cannot meet the requirement because the content information of the original video image is not enough. For example, for the darker region in the video image, even though the software is used to adjust the darker region to have a highest contrast value, a lot of content information still miss in the final display result because the original video image data does not contain these content information. Therefore, another method of directly adjusting the contrast value of the video capturing end is provided. However, in such method, the eyes of human are used to determine the adjustment result of the contrast value. Therefore, the adjustment result is not always correct. In other words, it is very difficult to use the above methods to improve the contrast value.

SUMMARY

Accordingly, the present invention provides a contrast value adjustment method. A software end is used to determine the image quality. The determined result is transferred to a firmware end to adjust the contrast value of the video capturing end. Therefore, the contrast value of the video capturing end can be dynamically changed to improve the image quality of the captured video.

An aspect of the invention is to provide a method for adjusting a contrast value of a video capturing end to an optimum contrast value. At first, a first video image and a first contrast value of the first video image are gathered by a software part. A reference image is generated according to the first video image. The first video image is compared with the reference image to generate a first image evaluation value and an operation is performed to determine whether the first image evaluation value is greater than a first threshold. When the first image evaluation value is smaller than the first threshold, a second contrast value is generated according to the first contrast value and a dynamical contrast adjusting value. The second contrast value is sent to a firmware part by the software part to adjust the contrast value of the video capturing end according to the second contrast value.

In an embodiment, the operation of generating the reference image according to the first video image further comprises: using a histogram equalization method to process the first video image to generate the reference image.

In an embodiment, the operation of comparing the first video image with the reference image to generate the first image evaluation value further comprises using a structural similarity (SSIM) evaluation process to compare the first video image with the reference image to generate the first image evaluation value.

In an embodiment, the operation of adjusting the contrast value of the video capturing end further comprises using the firmware part to adjust a contrast value of aperture of the video capturing end to the second contrast value.

In an embodiment, when the first image evaluation value is greater than the first threshold, the first contrast value is the optimum contrast value.

In an embodiment, the operation of determining the second contrast value according to the first contrast value and the dynamical contrast adjusting value further comprises: quantifying the first contrast value to make the first contrast value be between 0 and 100, setting the dynamical contrast adjusting value to a first positive value when the first contrast value is not greater than a second threshold; and setting the dynamical contrast adjusting value to a first negative value when the first contrast value is greater than a second threshold. The absolute values of the first positive value and the first negative are the same. The second contrast value is equal to the first contrast value plus the dynamical contrast adjusting value. The second threshold is 100−n, the first positive value is n and the first negative value is −n.

In an embodiment, the adjustment method further comprises: capturing a second video image by the video capturing end according to the second contrast value; comparing the second video image with the reference image to generate a second image evaluation value; determining whether the second image evaluation value is greater than the first threshold; determining whether the second image evaluation value is greater than the first image evaluation value when the second image evaluation value is smaller than the first threshold; determining a third contrast value according to the second contrast value and the dynamical contrast adjusting value when the second image evaluation value is greater than the first image evaluation value; determining whether the third contrast value is between 0 and 100; sending the third contrast value to the firmware part by the software part when the third contrast value is between 0 and 100; and adjusting the contrast value of the video capturing end by the firmware part according to the third contrast value.

In an embodiment, when the second image evaluation value is greater than the first threshold, the second contrast value is the optimum contrast value.

In an embodiment, the operation of comparing the second video image with the reference image to generate the second image evaluation value further comprises using a SSIM evaluation process to compare the second video image with the reference image to generate the second image evaluation value.

In an embodiment, when the third contrast value is not between 0 and 100, the second contrast value is the optimum contrast value.

In an embodiment, the operation of determining the third contrast value according to the second contrast value and the dynamical contrast adjusting value further comprises adding the dynamical contrast adjusting value to the second contrast value to form the third contrast value.

In an embodiment, when the second image evaluation value is greater than the first image evaluation value, the adjustment method further comprises: determining whether the first contrast value is between n and (100−n), and the dynamical contrast adjusting value has been multiplied by (−1); determining whether one of image evaluation values is greater than twice of the first image evaluation value when the first contrast value is located between n and (100−n) and the dynamical contrast adjusting value has not been multiplied by (−1); multiplying the dynamical contrast adjusting value by (−1) when there is no image evaluation values greater than twice of the first image evaluation value; determining a fourth contrast value according to the first contrast value and the dynamical contrast adjusting value that is multiplied by (−1); sending the fourth contrast value to the firmware part by the software part; and adjusting the contrast value of the video capturing end by the firmware part according to the fourth contrast value.

In an embodiment, the method further comprises setting an image evaluation value with a maximum value as an optimum image evaluation value and a contrast value corresponding to the optimum image evaluation value is the optimum contrast value when the first contrast value is not located between n and (100−n).

In an embodiment, the method further comprises to set an image evaluation value with a maximum value as an optimum image evaluation value and a contrast value corresponding to the optimum image evaluation value is the optimum contrast value when the dynamical contrast adjusting value has been multiplied by (−1).

In an embodiment, the method further comprises to set an image evaluation value that is greater than two times of the first image evaluation value as an optimum image evaluation value and a contrast value corresponding to the optimum image evaluation value is the optimum contrast value.

In an embodiment, the operation of determining whether the dynamical contrast adjusting value has been multiplied by (−1) further comprises to determine whether the first contrast value has been added by the dynamical contrast adjusting value and the first contrast value has been subtracted by the dynamical contrast adjusting value.

In an embodiment, the operation of determining a fourth contrast value according to the first contrast value and the dynamical contrast adjusting value that is multiplied by (−1) further comprises to add the dynamical contrast adjusting value that is multiplied by (−1) to the first contrast value to form the fourth contrast value.

In view of the above, the software part can send the contrast value to the firmware part. Then, the firmware part can dynamically adjust a contrast value of the video capturing end according to the received contrast value to improve the image quality.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
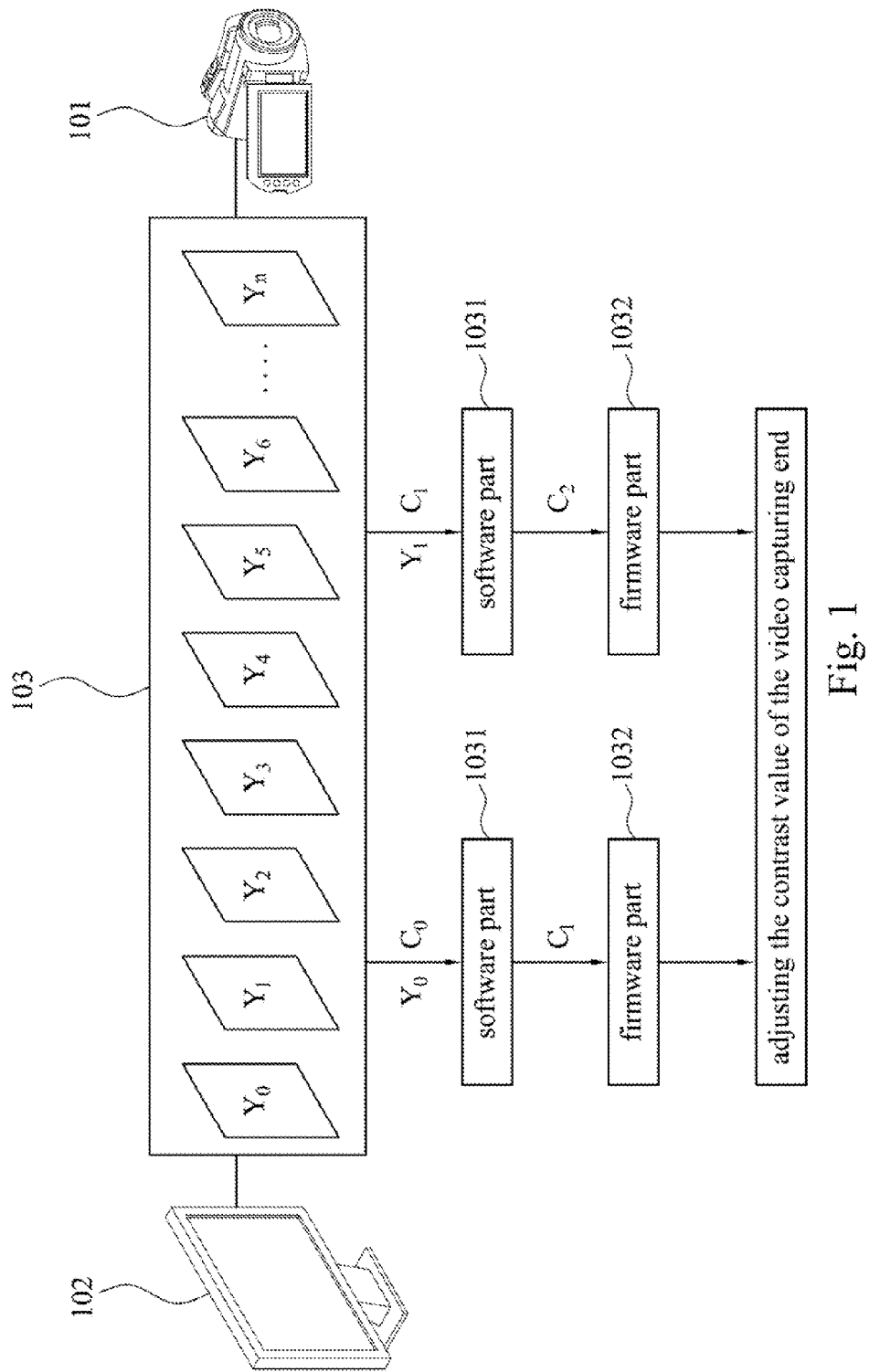
FIG. 1 illustrates a schematic diagram showing a contrast value adjustment in accordance with a preferred embodiment of the invention.

Specific embodiments of the invention are described in details as follows with reference to the accompanying drawings, wherein throughout the following description and drawings, the same reference numerals refer to the same or similar elements and are omitted when the same or similar elements are stated repeatedly.

FIG. 1 illustrates a schematic diagram to adjust video image contrast value in accordance with a preferred embodiment of the invention. A video capturing end 101, a video outputting end 102 and a video processing end 103 are used to adjust a video image contrast value. The video processing end 103 further comprises a software part 1031 and a firmware part 1032. Accordingly, the video capturing end 101 sequentially captures the video image Y0~Yn and send them to the video processing end 103. The video processing end 103 dynamically adjusts the contrast value of the video capturing end 101 according to the video image Y0~Yn. Then, the video capturing end 101 captures a next image according to the adjusted contrast value, and the video outputting end 102 displays this image. In an embodiment, the video capturing end 101 is a camera. The video outputting end 102 is a display. When the video processing end 103 adjusts the contrast value of the video capturing end 101, the video processing end 103 collects an initial video image (referred to as a video image Y0) captured by the video capturing end 101. Then, the video processing end 103 determines the initial contrast value C0 of the video image Y0 according to the contrast value of the video capturing end 101 used to capture the video image Y0. The software part 1031 determines a desired contrast value (referred to as a first contrast value C1) according to the initial contrast value C0 of the video image Y0. Then, the first contrast value C1 is sent to the firmware part 1032. The firmware part 1032 adjusts the contrast value of the video capturing end 101 according to the first contrast value C1. In an embodiment, the operation of adjusting the contrast value of the video capturing end fis to adjust a contrast value of aperture of the video capturing end to the first contrast value C1. The video capturing end 101 captures another next image (video image Y1) according to the adjusted contrast value. Then, the image quality of the video image Y0 is compared with that of the video image Y1 by the software part 1031 so as to determine another desired contrast value (referred to as a second contrast value C2). The second contrast value C2 is sent to the firmware part 1032. The firmware part 1032 adjusts the contrast value of the video capturing end 101 according to the second contrast value C2. In an embodiment, the operation of adjusting the contrast value of the video capturing end fis to adjust a contrast value of aperture of the video capturing end to the second contrast value C2. The video capturing end 101 captures another next image (video image Y2) according to the adjusted contrast value. Then, the image quality of the video image Y1 is compared with that of the video image Y2 by the software part 1031 so as to determine another desired contrast value (referred to as a third contrast value C3). The third contrast value C3 is sent to the firmware part 1032. The firmware part 1032 adjusts the contrast value of the video capturing end 101 according to the third contrast value C3. In an embodiment, the operation of adjusting the contrast value of the video capturing end fis to adjust a contrast value of aperture of the video capturing end to the third contrast value C3. The video capturing end 101 captures another next image (a video image Y3) according to the adjusted contrast value. Then, the image quality of the video image Y2 is compared with that of the video image Y3 by the software part 1031 to determine another desired contrast value (a fourth contrast value C4). The rest of the operations may be deduced by analogy. The above process is repeated until the image quality of the video image matches a threshold image quality. At this time, the contrast value is defined as the optimum contrast value.

Figure 2:
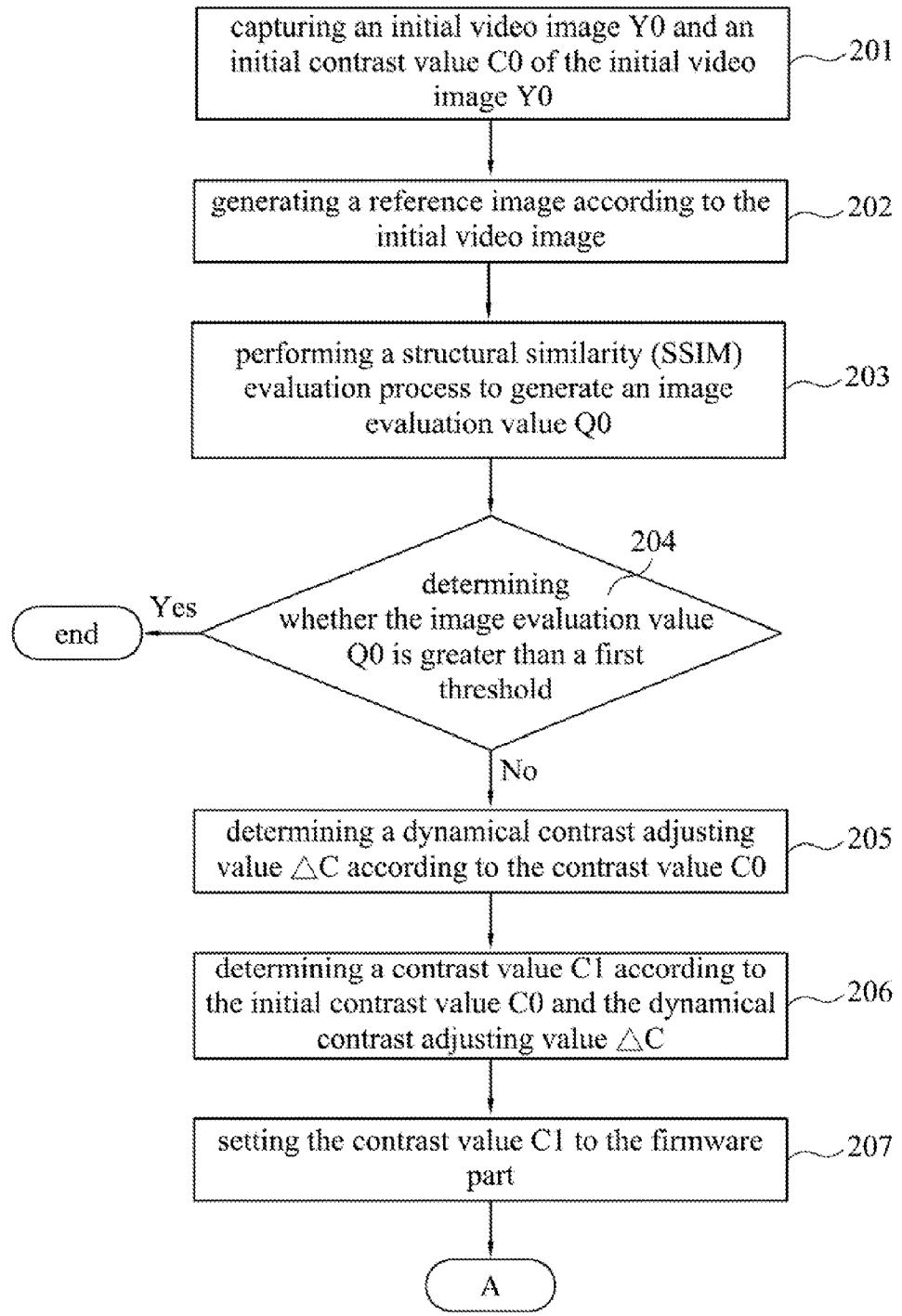
FIG. 2 illustrates a flow chart for determining a first contrast value C1 by the software part in accordance with a preferred embodiment of the invention.

FIG. 2 illustrates a flow chart to determine the first contrast value C1 by the software part in accordance with a preferred embodiment of the invention. Please refer to FIG. 1 and FIG. 2. In operation 201, the initial video image Y0 and its corresponding contrast value C0 are gathered. In an embodiment, the video processing end 103 collects the initial video image Y0 and the corresponding contrast value C0 gathered by the video capturing end 101. The initial video image Y0 is used to generate a reference image X. The contrast value C0 is used to determine a dynamical contrast adjusting value ΔC.

In operation 202, a reference image X is generated. In an embodiment, a histogram equalization method is used to process the initial video image Y0 to generate an image with better visual quality. This image is referred to as a reference image X. The image quality of the reference image X is used as the required image quality displayed by the video outputting end 102. The histogram equalization method is a technique for adjusting image intensities to enhance contrast. In an embodiment, the Histogram equalization method provided by T. Arici is used. A typical image contains millions of data points, called pixels. The histogram equalization method measures and equalizes each pixel's luminescence. By rearranging the pixels' luminescence, the contrast value of an image is improved.

In operation 203, a structural similarity (SSIM) evaluation process is performed to generate an image evaluation value Q0. The SSIM evaluation process is used to compare the luminescence l(x, y), contrast c(x, y) and structural s(x, y) of two video images. The structural similarity value is defined as follows.

$$SSIM(x,y)=[l(x,y)]^\alpha [c(x,y)]^\beta [s(x,y)]^\gamma$$

The maximum value of the structural similarity value is 1. Accordingly, the image evaluation value Q0 between the initial video image Y0 and the reference image X is calculated by the structural similarity evaluation process. The greater the image evaluation value Q0 is, the higher of the similarity between the initial video image Y0 and the reference image X is. That is, the image quality of the initial video image Y0 is similar to that of the reference image X. Therefore, in operation 204, a determination process is performed to determine whether the image evaluation value Q0 is greater than a threshold value, such as 0.95. When the image evaluation value Q0 is greater than 0.95, the image quality of the initial video image Y0 is similar to that of the reference image X. That is, the image quality of the initial video image Y0 matches the required image quality. Therefore, it is not necessary to adjust the contrast value of the video capturing end 101 again. The contrast adjustment process is ended.

In contrast, when the image evaluation value Q0 is smaller than 0.95, the image quality of the initial video image Y0 is not similar to that of the reference image X. That is, the image quality of the initial video image Y0 does not match the required image quality. Therefore, it is necessary to adjust the contrast value of the video capturing end 101 again. At this time, operation 205 is performed to determine the dynamical contrast adjusting value ΔC according to the contrast value C0. In an embodiment, the contrast value is quantified for convenience. The quantified contrast value is between 0 and 100. Accordingly, when the contrast value C0 of the initial video image Y0 is not greater than 95, the dynamical contrast adjusting value ΔC is set to a first positive value, such as 5. In contrast, when the contrast value C0 of the initial video image Y0 is greater than 95, the dynamical contrast adjusting value ΔC is set to a first negative value, such as −5. That is, the absolute value of the first positive value and that of the first negative value are the same. It is noted that the above embodiment does not intend to limit the dynamical contrast adjusting value ΔC. On the other hand, the contrast value C0 of the initial video image Y0 is not greater than 95. That is, when the dynamical contrast adjusting value ΔC is added to the contrast value C0 to form the first contrast value C1, the first contrast value C1 is still smaller than 100. Therefore, the dynamical contrast adjusting value ΔC is set to 5. In contrast, the contrast value C0 of the initial video image Y0 is greater than 95. That is, when the dynamical contrast adjusting value ΔC is added to the contrast value C0 to form the first contrast value C1, the first contrast value C1 is greater than 100. Therefore, the dynamical contrast adjusting value ΔC is set to −5.

In operation 206, the first contrast value C1 is determined. In an embodiment, the first contrast value C1 is equal to the contrast value C0 plus the dynamical contrast adjusting value ΔC, C1=C0+ΔC. Accordingly, the software part 1031 is responsible for to perform the operation 201 to the operation 206 to determine the first contrast value C1 according to the initial contrast value C0 of the video image Y0 when the image evaluation value Q0 between the initial video image Y0 and the reference image X is smaller than 0.95. Then, the first contrast value C1 is sent to the firmware part 1032 to set the contrast value. That is, the software part 1031 controls the firmware part 1032 to set the first contrast value C1 as it's contrast value in operation 207. Then, the first contrast value C1 is used to determine the following contrast value.

Figure 3:
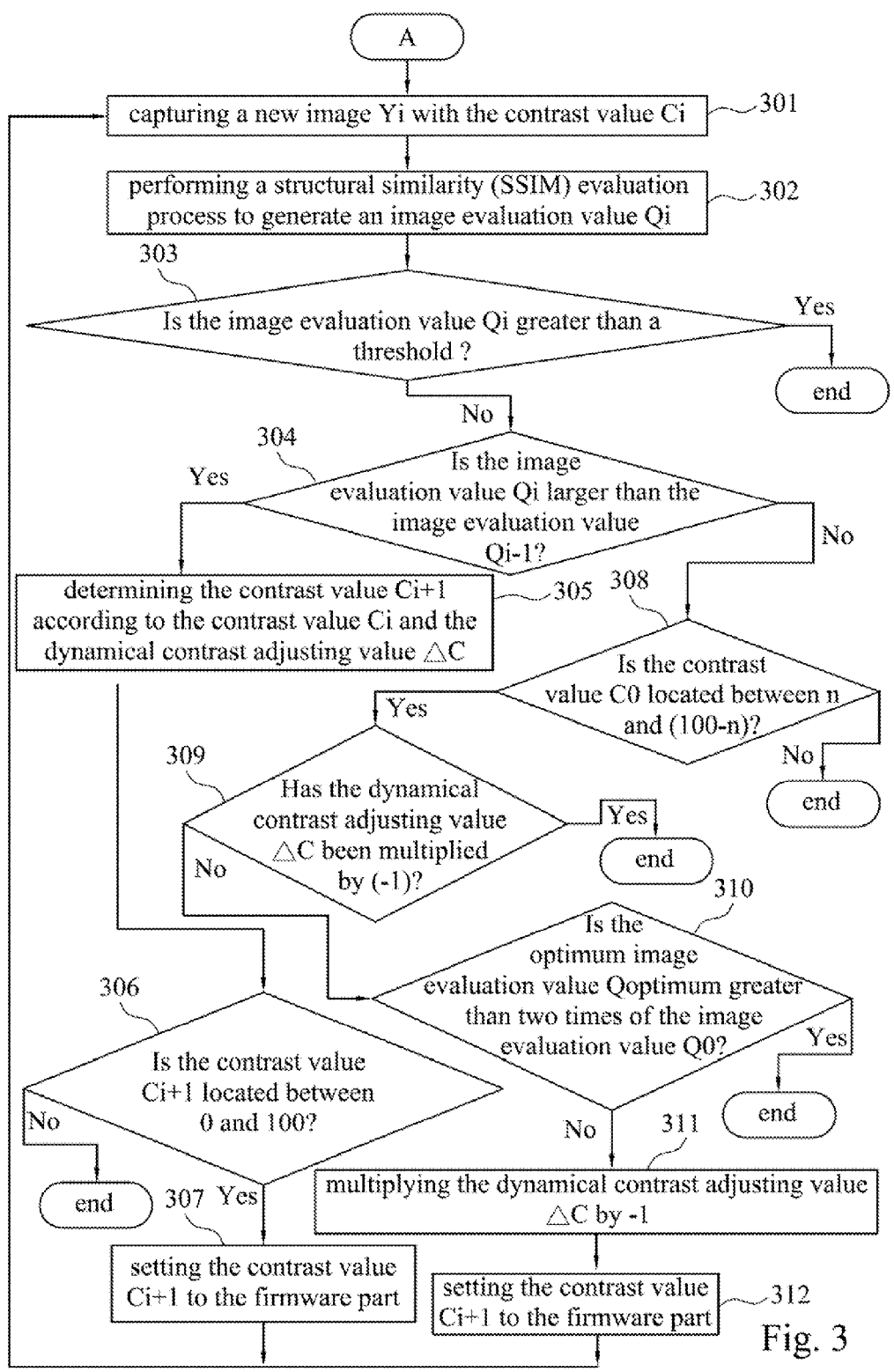
FIG. 3 illustrates a flow chart for determining the subsequent contrast value according to the first contrast value C1 by the software part in accordance with a preferred embodiment of the invention.

FIG. 3 illustrates a flow chart to determine the following contrast value according to the first contrast value C1 by the software part in accordance with a preferred embodiment of the invention. In operation 301, a new image Yi with the first contrast value C1 is gathered. In an embodiment, the video processing end 103 collects the first video image Y1 that is gathered by the video capturing end 101 with a contrast value adjusted according to the first contrast value C1.

In operation 302, a structural similarity (SSIM) evaluation process is performed to generate an image evaluation value Qi. The image evaluation value Qi between the video image Yi and the reference image X is calculated by the structural similarity evaluation process. That is, the image quality of the video image Yi is compared to that of the reference image X to determine the image evaluation value Qi.

Next, in operation 303, a determination process is performed to determine whether the image evaluation value Qi is greater than a threshold value, such as 0.95. When the image evaluation value Qi is greater than 0.95, the image quality of the video image Yi is very similar to that of the reference image X. That is, the image quality of the video image Yi matches the required image quality. Therefore, the adjusting contrast process is ended. In contrast, when the image evaluation value Qi is smaller than 0.95, the image quality of the video image Yi is not similar to that of the reference image X. That is, the image quality of the video image Yi does not match the required image quality. At this time, operation 304 is performed to determine whether the present image evaluation value Qi is greater than the previous image evaluation value Qi−1. When the present image evaluation value Qi is greater than the previous image evaluation value Qi−1, that is, the image quality is improved after the contrast value is adjusted by the dynamical contrast adjusting value IC, the adjusting direction is kept. Then, in operation 305, the contrast value Ci+1 is determined. In an embodiment, the contrast value Ci+1 is equal to the contrast value Ci plus the dynamical contrast adjusting value ΔC, Ci+1=Ci+ΔC. That is, if the contrast value Ci+1 is the second contrast value C2, the second contrast value C2 is equal to the first contrast value C1 plus the dynamical contrast adjusting value ΔC, C2=C1+ΔC.

In operation 306, a determination process is performed to determine whether the contrast value $C_{i+1}$ is located between 0 and 100. Because the range of the contrast value is set between 0 and 100, when the contrast value $C_{i+1}$ is not located between 0 and 100, which means the contrast value $C_{i+1}$ is wrong, the adjusting contrast value process is ended. At this time, the optimum contrast value is the contrast value $C_i$. In an embodiment, when the contrast value $C_2$ is not located between 0 and 100, which means the contrast value $C_2$ is wrong, the adjusting contrast value process is ended. At this time, the optimum contrast value is the contrast value $C_1$. Accordingly, the software part 1031 is responsible for to perform the operation 301 to the operation 306 to determine the contrast value $C_{i+1}$. Then, the contrast value $C_{i+1}$ is sent to the firmware part 1032 to set the contrast value in operation 307. That is, the software part 1031 controls the firmware part 1032 to set the contrast value $C_{i+1}$ as its contrast value. Then, the firmware part 1032 adjusts the contrast value of the video capturing end 101 according to the contrast value $C_{i+1}$. Then, the above operations are performed again until an optimum contrast value is found.

On the other hand, in operation 304, when the present image evaluation value $Q_i$ is not greater than the previous image evaluation value $Q_{i-1}$, that is, the image quality is not improved after the contrast value is adjusted by the dynamical contrast adjusting value $\Delta C$, the adjusting direction is not correct. Therefore, the dynamical contrast adjusting value $\Delta C$ is multiplied by −1 to cooperate with the contrast value $C_0$ to determine the new contrast value. That the adjusting direction is reversed. In an embodiment, the captured video image is the video image $Y_1$. The image quality of the video image $Y_1$ is compared with that of the reference image X to generate the image evaluation value $Q_1$. The image quality of the video image $Y_0$ is compared with that of the reference image X to generate the image evaluation value $Q_0$. Accordingly, operation 304 is used to determine whether the image evaluation value $Q_1$ is greater than the image evaluation value $Q_0$. When the image evaluation value $Q_1$ is greater than the image evaluation value $Q_0$ that is, compared with the image quality of the video image $Y_0$, the image quality of the video image $Y_1$ is more similar to the image quality of the reference image X, and using the dynamical contrast adjusting value $\Delta C$ to adjust the contrast value may improve the image quality. In contrast, when the image evaluation value $Q_1$ is smaller than the image evaluation value $Q_0$, that is, compared with the image quality of the video image $Y_1$, the image quality of the video image $Y_0$ is more similar to the image quality of the reference image X, and using the dynamical contrast adjusting value $\Delta C$ to adjust the contrast value may not improve the image quality. At this time, the dynamical contrast adjusting value $\Delta C$ is multiplied by −1 to cooperate with the contrast value $C_0$ to determine the new contrast value.

Because it is not necessary to evaluate the contrast value that has been evaluated, the new contrast value is calculated according to the contrast value $C_0$ of the video image $Y_0$. On the other hand, in operation 308, a determination process is performed to determine whether the contrast value $C_0$ is between n and (100−n) to prevent the adjusted contrast value from being out of the range between 0 and 100, and in operation 309, to determine whether the dynamical contrast adjusting value $\Delta C$ has been multiplied by −1 to prevent the same adjusting process from being performed repeatedly. In this embodiment, n is a natural number, for example, n is equal to 5. However, n is not limited to be equal to 5. When the contrast value $C_0$ of the video image $Y_0$ is greater than 95, the first contrast value $C_1$ is greater than 100 when the dynamical contrast adjusting value $\Delta C$ is added to the contrast value $C_0$ to form the first contrast value $C_1$. In contrast, because the first contrast value $C_1$ is equal to the contrast value $C_0$ minus the dynamical contrast adjusting value, the first contrast value $C_1$ will be smaller than 0 if the contrast value $C_0$ of the video image $Y_0$ is smaller than 5. Therefore, the contrast value $C_0$ is limited to be between 5 and 95. Accordingly, when the contrast value $C_0$ is out of the range between n and (100−n) in operation 308, the adjusting process is ended. At this time, the contrast value corresponding to a maximum image evaluation value the optimum contrast value. On the other hand, when the contrast value $C_0$ is in the range between n and (100−n) in operation 308, the operation 309 is performed to determine whether the dynamical contrast adjusting value $\Delta C$ has been multiplied by −1 to prevent the same adjusting process from being performed repeatedly. When the dynamical contrast adjusting value $\Delta C$ has been multiplied by −1, the adjusting process is ended. At this time, the contrast value corresponding to a maximum image evaluation value is the optimum contrast value.

In contrast, when the contrast value $C_0$ is in the range between n and (100−n) in operation 308 and the dynamical contrast adjusting value $\Delta C$ has not been multiplied by −1 in operation 309, operation 310 is performed to determine whether the optimum image evaluation value $Q_{optimum}$ is greater than two times of the image evaluation value $Q_0$. Because when the optimum image evaluation value $Q_{optimum}$ is greater than two times of the image evaluation value $Q_0$, the image quality has been improved much. At this time, the adjusting process is ended. The contrast value corresponding to the optimum image evaluation value $Q_{optimum}$ is used to adjust the contrast value of the video capturing end 101.

In contrast, when the optimum image evaluation value $Q_{optimum}$ is not greater than two times of the image evaluation value $Q_0$, the dynamical contrast adjusting value $\Delta C$ is multiplied by −1 to cooperate with the contrast value $C_0$ to determine the new contrast value $C_{i+1}$ in the operation 311, $C_{i+1}=C_0+\Delta C$. Then, the contrast value $C_{i+1}$ is sent to the firmware part 1032 to set the contrast value in operation 312. That is, the software part 1031 controls the firmware part 1032 to set the contrast value $C_{i+1}$ as its contrast value. Then, the firmware part 1032 adjusts the contrast value of the video capturing end 101 according to the contrast value $C_{i+1}$. Then, the operation 301 is performed again to capture the video image captured by the video capturing end 101 according to the contrast value $C_{i+1}$. Then, the above operations are performed again until an optimum contrast value is found.

Accordingly, the software part can send the contrast value to the firmware part. Then, the firmware part can dynamically adjust a contrast value of the video capturing end according to the received contrast value to improve the image quality.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A method for adjusting a contrast value at a video capturing end to an optimum contrast value, comprising:

capturing a first video image and a first contrast value of the first video image by a software part;

generating a reference image according to the first video image;

comparing the first video image with the reference image to generate a first image evaluation value;

determining whether the first image evaluation value is greater than a first threshold;

determining a second contrast value according to the first contrast value and a dynamical contrast adjusting value when the first image evaluation value is smaller than the first threshold:

sending the second contrast value to a firmware part by the software part; and adjusting the contrast value the video capturing end by the firmware part according to the second contrast value.

2. The method of claim 1, wherein the operation of generating the reference image according to the first video image further comprises using a histogram equalization method to process the first video image to generate the reference image.

3. The method of claim 1, wherein the operation of comparing the first video image with the reference image to generate the first image evaluation value further comprises using a structural similarity (SSIM) evaluation process to compare the first video image with the reference image to generate the first image evaluation value.

4. The method of claim 1, wherein the operation of adjusting the contrast value of the video capturing end further comprises using the firmware part to adjust a contrast value of aperture of the video capturing end to the second contrast value.

5. The method of claim 1, wherein when the first image evaluation value is greater than the first threshold, the first contrast value is the optimum contrast value.

6. The method of claim 1, wherein the operation of determining the second contrast value according to the first contrast value and the dynamical contrast adjusting value further comprises:

quantifying the first contrast value to make the first contrast value be between 0 and 100;

setting the dynamical contrast adjusting value to a first positive value when the first contrast value is smaller than or equal to a second threshold; and setting the dynamical contrast adjusting value to a first negative value when the first contrast value is greater than a second threshold;

wherein the absolute values of the first positive value and the first negative are the same;

wherein the second contrast value is equal to the first contrast value plus the dynamical contrast adjusting value.

7. The method of claim 6, wherein the second threshold is 100−n, and the first positive value is n, and the first negative value is −n, wherein n is a nature number.

8. The method of claim 1, further comprising:

capturing a second video image by the video capturing end according to the second contrast value;

comparing the second video image with the reference image to generate a second image evaluation value;

determining whether the second image evaluation value is greater than the first threshold;

determining whether the second image evaluation value is greater than the first image evaluation value when the second image evaluation value is smaller than the first threshold;

determining a third contrast value according to the second contrast value and the dynamical contrast adjusting value when the second image evaluation value is greater than the first image evaluation value;

determining whether the third contrast value is between 0 and 100;

sending the third contrast value to the firmware part by the software part when the third contrast value is between 0 and 100; and adjusting the contrast value of the video capturing end by the firmware part according to the third contrast value.

9. The method of claim 8, wherein when the second image evaluation value is greater than the first threshold, the second contrast value is the optimum contrast value.

10. The method of claim 8, wherein the operation of comparing the second video image with the reference image to generate the second image evaluation value further comprises using a SSIM evaluation process to compare the second video image with the reference image to generate the second image evaluation value.

11. The method of claim 8, wherein when the third contrast value is not between 0 and 100, the second contrast value is the optimum contrast value.

12. The method of claim 8, wherein the operation of determining the third contrast value according to the second contrast value and the dynamical contrast adjusting value further comprises adding the dynamical contrast adjusting value to the second contrast value to form the third contrast value.

13. The method of claim 8, wherein when the second image evaluation value is less than the first image evaluation value, the method further comprises:

determining whether the first contrast value is between n and (100−n), and whether the dynamical contrast adjusting value has been multiplied by (−1);

determining whether one of image evaluation values is greater than twice of the first image evaluation value when the first contrast value is between a and (100−n) and the dynamical contrast adjusting value has not been multiplied by (−1);

multiplying the dynamical contrast adjusting value by (−1) when there is no image evaluation values greater than twice of the first image evaluation value;

determining a fourth contrast value according to the first contrast value and the dynamical contrast adjusting value that is multiplied by (−1);

sending the fourth contrast value to the firmware part by the software part; and adjusting the contrast value of the video capturing end by the firmware part according to the fourth contrast value.

14. The method of claim 13, further comprising:

when the first contrast value is not located between n and (100−n), setting the maximum of image evaluation values as an optimum image evaluation value, and setting a contrast value corresponding to the optimum image evaluation value as the optimum contrast value.

15. The method of claim 13, further comprising:

when the dynamical contrast adjusting value has been multiplied by (−1), setting the maximum of image evaluation values as an optimum image evaluation value, and setting a contrast value corresponding to the optimum image evaluation value as the optimum contrast value.

16. The method of claim 13, further comprising:

setting an image evaluation value that is greater than twice of the first image evaluation value as a optimum image evaluation value, and setting a contrast value corresponding to the optimum image evaluation value as the optimum contrast value.

17. The method of claim 13, wherein the operation of determining whether the dynamical contrast adjusting value has been multiplied by (−1) further comprising:

determining whether the first contrast value has been added by the dynamical contrast adjusting value and the first contrast value has been subtracted by the dynamical contrast adjusting value.

18. The method of claim 13, wherein the operation of determining the fourth contrast value according to the first contrast value and the dynamical contrast adjusting value that is multiplied by (−1) further comprises:

adding the dynamical contrast adjusting value that is multiplied by (−1) to the first contrast value to form the fourth contrast value.

19. The method of claim 13, wherein the operation of determining a fourth contrast value according to the first contrast value and the dynamical contrast adjusting value that is multiplied by (−1) further comprises to add the first contrast value and the dynamical contrast adjusting value that is multiplied by (−1) to form the fourth contrast value.

* * * * *